US008504980B1

(12) United States Patent
Kraft et al.

(10) Patent No.: US 8,504,980 B1
(45) Date of Patent: Aug. 6, 2013

(54) CONSTRAINING DATA CHANGES DURING TRANSACTION PROCESSING BY A COMPUTER SYSTEM

(75) Inventors: Frank Michael Kraft, Speyer (DE); Bernhard Thimmel, Edingen-Neckarhausen (DE); Stefan Baeuerle, Rauenberg-Rotenberg (DE); Robert Getzner, Heidelberg (DE)

(73) Assignee: SAP AG, Walldorf (DE)

( * ) Notice: Subject to any disclaimer, the term of this patent is extended or adjusted under 35 U.S.C. 154(b) by 1237 days.

(21) Appl. No.: 12/102,548

(22) Filed: Apr. 14, 2008

(51) Int. Cl.
*G06F 9/44* (2006.01)

(52) U.S. Cl.
USPC .......................................................... 717/104

(58) Field of Classification Search
None
See application file for complete search history.

(56) References Cited

U.S. PATENT DOCUMENTS

| | | | |
|---|---|---|---|
| 5,212,792 A | 5/1993 | Gerety et al. |
| 5,295,222 A | 3/1994 | Wadhwa et al. |
| 5,404,496 A | 4/1995 | Burroughs et al. |
| 5,555,415 A | 9/1996 | Allen |
| 5,652,714 A | 7/1997 | Peterson et al. |
| 5,671,360 A | 9/1997 | Hambrick et al. |
| 5,758,029 A | 5/1998 | Hall |
| 5,781,545 A | 7/1998 | Matthew |
| 5,801,687 A | 9/1998 | Peterson et al. |
| 5,890,146 A | 3/1999 | Wavish et al. |
| 5,920,718 A | 7/1999 | Uczekaj et al. |
| 5,983,016 A | 11/1999 | Brodsky et al. |
| 5,991,733 A | 11/1999 | Aleia et al. |
| 6,078,325 A | 6/2000 | Jolissaint et al. |
| 6,151,023 A | 11/2000 | Chari |
| 6,175,837 B1 | 1/2001 | Sharma et al. |
| 6,182,277 B1 * | 1/2001 | DeGroot et al. .............. 717/115 |
| 6,308,224 B1 | 10/2001 | Leymann et al. |
| 6,324,496 B1 | 11/2001 | Alur et al. |
| 6,408,262 B1 | 6/2002 | Leerberg et al. |
| 6,442,515 B1 | 8/2002 | Varma et al. |
| 6,480,955 B1 | 11/2002 | DeKoning et al. |
| 6,553,403 B1 | 4/2003 | Jarriel et al. |
| 6,681,383 B1 | 1/2004 | Pastor et al. |
| 6,760,733 B1 | 7/2004 | Komine et al. |
| 6,769,048 B2 | 7/2004 | Goldberg et al. |
| 6,772,036 B2 | 8/2004 | Eryurek et al. |

(Continued)

FOREIGN PATENT DOCUMENTS

EP 1 674 990 6/2006
WO WO 2005/117549 12/2005

OTHER PUBLICATIONS

Office action from U.S. Appl. No. 12/333,197. dated Oct. 14, 2011, 14 pages.

(Continued)

*Primary Examiner* — Wei Zhen
*Assistant Examiner* — Adam R Banes
(74) *Attorney, Agent, or Firm* — Fish & Richardson P.C.

(57) ABSTRACT

Data changes during transaction processing by a computer system are constrained. An outbound processing sub-component of a first processing component is enabled to change a value of a status variable relating to processing performed on a data object instance by the first processing component. The data object instance includes values for variables and methods capable of being performed by the data object instance. The outbound processing sub-component is configured to trigger subsequent processing steps in a second processing component. The outbound processing sub-component is permitted to change only the status variable and is not permitted to change any other variable.

18 Claims, 8 Drawing Sheets

U.S. PATENT DOCUMENTS

| | | | |
|---|---|---|---|
| 6,973,460 | B1 | 12/2005 | Mitra |
| 7,117,293 | B1 | 10/2006 | Graziano et al. |
| 7,120,896 | B2 | 10/2006 | Budhiraja et al. |
| 7,191,149 | B1 | 3/2007 | Lanham et al. |
| 7,451,447 | B1 | 11/2008 | Deshpande |
| 7,577,681 | B1 | 8/2009 | Rozenman et al. |
| 7,606,791 | B2 | 10/2009 | Dettinger et al. |
| 7,613,993 | B1 | 11/2009 | Baer et al. |
| 7,707,621 | B2* | 4/2010 | Walmsley ............. 726/2 |
| 7,761,337 | B2 | 7/2010 | Caballero et al. |
| 8,055,527 | B1 | 11/2011 | Gil et al. |
| 2002/0013777 | A1 | 1/2002 | Diener |
| 2002/0038206 | A1 | 3/2002 | Dori |
| 2002/0062475 | A1 | 5/2002 | Iborra et al. |
| 2002/0083413 | A1 | 6/2002 | Kodosky et al. |
| 2002/0138290 | A1 | 9/2002 | Metcalfe et al. |
| 2002/0152102 | A1 | 10/2002 | Brodersen et al. |
| 2002/0167544 | A1 | 11/2002 | Raghavan et al. |
| 2002/0194388 | A1 | 12/2002 | Boloker et al. |
| 2003/0018461 | A1 | 1/2003 | Beer et al. |
| 2003/0018508 | A1 | 1/2003 | Schwanke |
| 2003/0028858 | A1 | 2/2003 | Hines |
| 2003/0046658 | A1 | 3/2003 | Raghaven et al. |
| 2003/0050813 | A1 | 3/2003 | Cohen et al. |
| 2003/0074090 | A1 | 4/2003 | Becka et al. |
| 2003/0074371 | A1 | 4/2003 | Park et al. |
| 2003/0195789 | A1 | 10/2003 | Yen |
| 2004/0027388 | A1 | 2/2004 | Berg et al. |
| 2004/0049436 | A1 | 3/2004 | Brand et al. |
| 2004/0059808 | A1 | 3/2004 | Galloway et al. |
| 2004/0078258 | A1 | 4/2004 | Schulz et al. |
| 2004/0080534 | A1* | 4/2004 | Quach ............. 345/751 |
| 2004/0083448 | A1 | 4/2004 | Schulz et al. |
| 2004/0119752 | A1* | 6/2004 | Beringer et al. ............. 345/779 |
| 2004/0133526 | A1* | 7/2004 | Shmueli et al. ............. 705/80 |
| 2004/0139104 | A1 | 7/2004 | Kuntz-Mayr et al. |
| 2004/0153357 | A1* | 8/2004 | De Sylva ............. 705/9 |
| 2004/0181775 | A1 | 9/2004 | Anonsen et al. |
| 2004/0193510 | A1 | 9/2004 | Catahan, Jr. et al. |
| 2004/0220956 | A1 | 11/2004 | Dillon |
| 2004/0225919 | A1 | 11/2004 | Reissman et al. |
| 2004/0233232 | A1 | 11/2004 | Iborra et al. |
| 2005/0004888 | A1 | 1/2005 | McCrady et al. |
| 2005/0004951 | A1 | 1/2005 | Ciaramitaro et al. |
| 2005/0010504 | A1 | 1/2005 | Gebhard et al. |
| 2005/0027811 | A1 | 2/2005 | Kraft |
| 2005/0071359 | A1* | 3/2005 | Elandassery et al. ......... 707/102 |
| 2005/0137928 | A1 | 6/2005 | Scholl et al. |
| 2005/0240458 | A1* | 10/2005 | Ciacciarelli et al. ............. 705/8 |
| 2005/0256665 | A1 | 11/2005 | Hartmann et al. |
| 2005/0278217 | A1* | 12/2005 | Adams et al. ............. 705/14 |
| 2006/0020366 | A1* | 1/2006 | Bloom ............. 700/226 |
| 2006/0069605 | A1 | 3/2006 | Hatoun |
| 2006/0085681 | A1 | 4/2006 | Feldstein et al. |
| 2006/0095439 | A1 | 5/2006 | Buchmann et al. |
| 2006/0136923 | A1 | 6/2006 | Kahn et al. |
| 2006/0143047 | A1* | 6/2006 | Briegs et al. ............. 705/2 |
| 2006/0179383 | A1 | 8/2006 | Blass et al. |
| 2006/0227350 | A1 | 10/2006 | Crawford et al. |
| 2006/0265691 | A1 | 11/2006 | Klinger et al. |
| 2006/0277523 | A1* | 12/2006 | Horen et al. ............. 717/106 |
| 2006/0294158 | A1 | 12/2006 | Tsyganskiy et al. |
| 2007/0142935 | A1 | 6/2007 | Danielsson et al. |
| 2007/0156427 | A1 | 7/2007 | Dentzer et al. |
| 2007/0192715 | A1* | 8/2007 | Kataria et al. ............. 715/764 |
| 2007/0226025 | A1 | 9/2007 | Chang et al. |
| 2007/0282570 | A1 | 12/2007 | Thompson et al. |
| 2007/0282916 | A1 | 12/2007 | Albahari et al. |
| 2008/0005061 | A1 | 1/2008 | Kraft |
| 2008/0005152 | A1 | 1/2008 | Kraft |
| 2008/0005153 | A1 | 1/2008 | Kraft |
| 2008/0005162 | A1 | 1/2008 | Kraft |
| 2008/0005625 | A1 | 1/2008 | Kraft |
| 2008/0005739 | A1 | 1/2008 | Sadiq |
| 2008/0005743 | A1 | 1/2008 | Kraft |
| 2008/0005747 | A1 | 1/2008 | Meyer et al. |
| 2008/0015883 | A1 | 1/2008 | Hermann |
| 2008/0046862 | A1 | 2/2008 | Sattler et al. |
| 2008/0162672 | A1 | 7/2008 | Krasinskiy |
| 2009/0089309 | A1 | 4/2009 | Thimmel |
| 2009/0281777 | A1* | 11/2009 | Baeuerle et al. ............. 703/6 |

OTHER PUBLICATIONS

Office action from U.S. Appl. No. 12/634,834, dated Oct. 12, 2011, 17 pages.

Office action from U.S. Appl. No. 12/634,996, dated Sep. 8, 2011, 14 pages.

Office action from U.S. Appl. No. 11/617,580, dated Dec. 8, 2011, 37 pages.

'Unified Modeling Language: Superstructure Version 2.0' [online]. Object Management Group, 2005, [retrieved on Nov. 27, 2006]. Retrieved from the Internet: <URL: www.omg.org/docs/formal/05-07-04.pdf>, pp. 8-12.

'Status Management' [online]. SAP, [retrieved on Nov. 27, 2006]. Retrieved from the Internet: <URL: help.sap.com/saphelp_47x200/helpdata/en/ee/41f79346ee11d189470000e829fbbd/content.htm>, 2 pages.

Status Management [online]. SAP, [retrieved on Nov. 27, 2006]. Retrieved from the Internet: <URL: help.sap.com/saphelp_47x200/helpdata/en/f0/ca3965260211d28a430000e829fbbd/content.htm>, 1 page.

'User Status' [online]. SAP, [retrieved on Nov. 27, 2006]. Retrieved from the Internet: <URL: help.sap.com/saphelp_47x200/helpdata/en/f0/ca39a6260211d28a430000e829fbbd/content.htm>, 1 page.

'Workflow Management Coalition The Workflow Reference Model' [online]. Workflow Management Coalition, 1995, [retrieved on Nov. 27, 2006]. Retrieved from the Internet: <URL: www.wfmc.org/standards/docs/tc003v11.pdf>, 55 pages.

'Introduction to OMG's Unified Modeling Language™ (UML ®)' [online]. Object Management Group, 2005 [retrieved on Nov. 26, 2006]. Retrieved from the Internet: <URL: omg.org/gettingstarted/what_is_uml.htm>, 16 pages.

Leavens, Gary T. et al., "Preliminary Design of JML: A Behavioral Interface Specification Language of Java," ACM SIGSOFT Software Engineering Notes, vol. 31, No. 3, May 2006, pp. 1-38.

Kiczales, Gregor et al., "An Overview of AspectJ," Lecture notes in Computer Science, Springer Verlag, Berlin, Germany, vol. 2072, Jun. 18, 2001, pp. 327-353.

Jason Zhicheng Li, "Business Object State Management Using State Machine Compiler," Internet Citation, May 1, 2006 (May 2, 2006), XP002396380, Retrieved from the internet: http://today.java.ne/pub/a/today/2006/01/05/business-object-state management-using-smc.html, retrieved Aug. 24, 2006.

Eric Armstrong, "How to implement state-dependent behavior—Doing the State pattern in Java," internet citation, XP002246628 ISSN: 1091-8906, Retrieved from the internet: http://222.javaworld.com/javaworld/jw-08-1997/jw-08-stated_p.html, retrieved on Jul. 7, 2003.

W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.

Lohman et al., "Behavioral Contraints for Services", Business Process Management, 5th International Conference, BPM, 2007 Brisbane, Australia.

Holger Giese, "Object-Oriented Design and Architecture of Distributed Systems", Inaugural-Dissertation, Department of Mathematics and Computer Science, Faculty of Mathematics and Natural Science, Westfälischen Wilhelms-Universität Münster, for the degree of Doctor of Science, Feb. 2001.

Beugnard et al., "Making Components Contract Aware", IEEE Computer Society, Jul. 1999, pp. 38-45.

Wirtz et al., "The OCoN Approach to Workflow Modeling in Object-Oriented Systems", Information Systems Frontiers 3:3, 357-376, 2001.

"Unified Modeling Language: Superstructure", Version 2.0, formal/Jul. 4, 2005, Object Management Group, Aug. 2005.

"Unified Modeling Language: Infrastructure", Version 2.1.1 (without change bars), formal/Jul. 2, 2006, Object Management Group, Feb. 2007.

"Unified Modeling Language: Superstructure", Version 2.1.1 (non-change bar), formal/Jul. 2, 2005, Object Management Group, Feb. 2007.

"Object Constraint Language", OMG Available Specification, Version 2.0, formal/Jun. 5, 2001, Object Management Group, May 2006.

Baldan et al., "Functorial Concurrent Semantics for Petri Nets and Read and Inhibitor Arcs", Lecture Notes in Computer Science, vol. 1877, Proceedings of the 11$^{th}$ International Conference on Concurrency Theory, Springer-Verlag, 2000.

"Business Process Modeling Notation Specification", Final Adopted Specification, dtc/Jun. 2, 2001, Object Management Group, Feb. 2006.

S. Christensen and N. Hansen, "Coloured Petri Nets Extended with Place Capacities, Test Arcs and Inhibitor Arcs", Lecture Notes in Computer Science, vol. 691, Proceedings of the 14$^{th}$ International Conference on Application and Theory of Petri Nets, Springer-Verlag, 1993.

S. Stelting et al., "Applied Java Patterns" (Online), Dec. 26, 2001, Prentice Hall, retrieved from the internet: http://proquest.safaribooksonline.com/0130935387?tocview=true>, retrieved Aug. 7, 2009).

International Search Report and Written Opinion of the International Searching Authority issued on Nov. 30, 2007, in corresponding application PCT/ EP2007/005785.

International Search Report and Written Opinion of the International Searching Authority issued in PCT/EP2007/005783 on Jan. 7, 2009.

International Search Report and Written Opinion of the International Searching Authority issued in PCT/EP2007/005779 on Dec. 30, 2008.

International Search Report and Written Opinion of the International Searching Authority issued in PCT/EP2007/005782 on Dec. 30, 2008.

International Search Report and Written Opinion of the International Searching Authority issued in PCT/EP2007/005786 on Jan. 8, 2009.

International Search Report and Written Opinion of the International Searching Authority issued in PCT/EP2007/005784 on Dec. 29, 2008.

International Search Report and Written Opinion of the International Searching Authority issued in PCT/EP2007/005781 on Dec. 30, 2008.

Extended European Search Report issued in 07025131.9-1243 / 1939744 on Aug. 19, 2009.

Non-Final Office Action issued in U.S. Appl. No. 11/617,462 on Nov. 20, 2009.

Non-Final Office Action issued in U.S. Appl. No. 11/862,813 on Nov. 25, 2009.

Thimmel et al., U.S. Appl. No. 12/020,984, filed on Jan. 28, 2008.

Kraft et al., U.S. Appl. No. 12/634,834, filed Dec. 10, 2009.

Kraft et al., U.S. Appl. No. 12/634,996, filed Dec. 10, 2009.

Final office action from U.S. Appl. No. 11/617,577, dated Aug. 25, 2010, 21 pages.

Final office action from U.S. Appl. No. 11/617,495, dated Aug. 25, 2010, 16 pages.

Office action from U.S. Appl. No. 11/617,464, dated Sep. 3, 2010, 14 pages.

Final office action from U.S. Appl. No. 12/020,984, dated Sep. 30, 2010, 17 pages.

Office action from U.S. Appl. No. 11/617,462, dated Nov. 1, 2010, 16 pages.

Office action from U.S. Appl. No. 11/617,647, dated Nov. 5, 2010, 26 pages.

Office action from U.S. Appl. No. 11/617,638, dated Sep. 30, 2010, 16 pages.

Office action from U.S. Appl. No. 11/617,464, dated Feb. 28, 2011, 14 pages.

Final office action from U.S. Appl. No. 11/617,647, dated Jul. 11, 2011, 26 pages.

Final office action from U.S. Appl. No. 11/617,462, dated Jul. 21, 2011, 19 pages.

Non-Final Office Action issued in U.S. Appl. No. 11/477,787 on Dec. 29, 2009, 12 pages.

Final office action from U.S. Appl. No. 11/477,787 dated Jun. 24, 2010, 18 pages.

Non-Final Office Action issued in U.S. Appl. No. 11/617,580 on Dec. 30, 2009, 13 pages.

Office action from U.S. Appl. No. 11/617,577 dated Mar. 25, 2010, 21 pages.

Office action from U.S. Appl. No. 11/617,495 dated Mar. 18, 2010, 17 pages.

Final Office Action from U.S. Appl. No. 11/617,580 dated Jun. 24, 2010, 13 pages.

Office action from U.S. Appl. No. 11/617,616 dated Apr. 19, 2010, 15 pages.

Office action from U.S. Appl. No. 11/617,462 dated May 11, 2010, 23 pages.

Final Office Action from U.S. Appl. No. 11/862,813 dated Jun. 11, 2010, 7 pages.

Office action from U.S. Appl. No. 12/020,984 dated Apr. 12, 2010, 10 pages.

Final office action from U.S. Appl. No. 12/634,996, dated Jan. 4, 1012, 9 pages.

Final office action from U.S. Appl. No. 11/617,580, dated Jun. 15, 2012, 31 pages.

Final office action from U.S. Appl. No. 12/634,834, dated Jun. 11, 2012, 19 pages.

Final office action from U.S. Appl. No. 12/333,197, dated May 3, 2012, 14 pages.

Office action from U.S. Appl. No. 12/571,759, dated May 24, 2012, 6 pages.

* cited by examiner

CONSTRAINING DATA CHANGES DURING TRANSACTION PROCESSING BY A COMPUTER SYSTEM

TECHNICAL FIELD

This description relates to techniques for constraining data changes during transaction processing by a computer system.

BACKGROUND

Enterprise information technology (IT) systems often are used to manage and process business data. To do so, a business enterprise may use various application programs running on one or more enterprise IT systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. Application programs may allow for users to see a list of tasks to which they are assigned.

Software systems and components may be developed using object technology, and the operation of these systems and components may occur through methods that are performed on and/or by objects. The execution of a method may change attribute values of an object, which, in turn, may lead to a new state of the object.

SUMMARY

In one general aspect, data changes during transaction processing by a computer system are constrained. An outbound processing sub-component of a first processing component is enabled to change a value of a status variable relating to processing performed on a data object instance by the first processing component. The data object instance includes values for variables and methods capable of being performed by the data object instance. The outbound processing sub-component is configured to trigger subsequent processing steps in a second processing component. The outbound processing sub-component is permitted to change only the status variable and is not permitted to change any other variable.

Implementations may include one or more of the following features. For example, the outbound processing sub-component may include a first outbound processing sub-component of the first processing component. The value of the status variable relating to processing performed on a data object instance by the first processing component may include a first value of a first status variable. The first processing component may include a second outbound processing sub-component configured to trigger subsequent processing steps in a third processing component. The second outbound processing sub-component of the first processing component may be enabled to change a second value of a second status variable relating to processing performed on a data object instance by the first processing component. The second outbound processing sub-component may be permitted to change only the second status variable and may not permitted to change any other variable.

The first outbound processing sub-component may be configured to trigger subsequent processing steps in the second processing component by sending a first message having a first type to the second processing component. The second outbound processing sub-component i may be s configured to trigger subsequent processing steps in the third processing component by sending a message having a second type to the third processing component.

The first value of the first status variable relating to processing performed on a data object instance by the first processing component may include a first value indicating the sending of the first message. The first outbound processing sub-component may be prohibited of including the second value of the second variable in the message sent to the first processing component. The second outbound processing sub-component may be prohibited of including the first value of the second variable in the message sent to the second processing component.

The first outbound processing sub-component may be permitted to include the first value of the first variable in the message sent to the first processing component. The second outbound processing sub-component may be permitted to include the second value of the second variable in the message sent to the second processing component.

The first outbound processing sub-component may be permitted to use the first value of the first variable to determine processing to be triggered. The first outbound processing sub-component may not be permitted to use the second value of the second variable to determine processing to be triggered. The second outbound processing sub-component may be permitted to use the second value of the second variable to determine processing to be triggered. The second outbound processing sub-component may not be permitted to use the first value of the first variable to determine processing to be triggered.

A status schema model may be accessed where the status schema model may be defined at design-time, may be stored in a computer-readable medium and may include a precondition identifying how a status affects whether an action is to be allowed to be performed at runtime by a data object instance having the status. A status schema instance may be created for the data object instance, where the status schema instance corresponds to the status schema model. Based on the status of the data object instance, a determination may be made as to whether a particular action is allowed to be performed by the data object instance. In response to a determination that the particular action is allowed, the particular action may be enabled to be executed by the first processing component.

The status of the data object instance may include a status variable and a particular status value, where the particular status value being one of a set of possible status values for the status variable. The variables of the data object instance may include one or more status variables, where a status variable being associated with a set of possible status values for the status variable. The status may represent a stage in the computer-based process. The particular action may correspond to a method of the data object node instance. The particular action may correspond to at least one status value in the set of possible status values for the status variable.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

Like reference symbols in the various drawings indicate like elements.

DETAILED DESCRIPTION

Figure 1A:
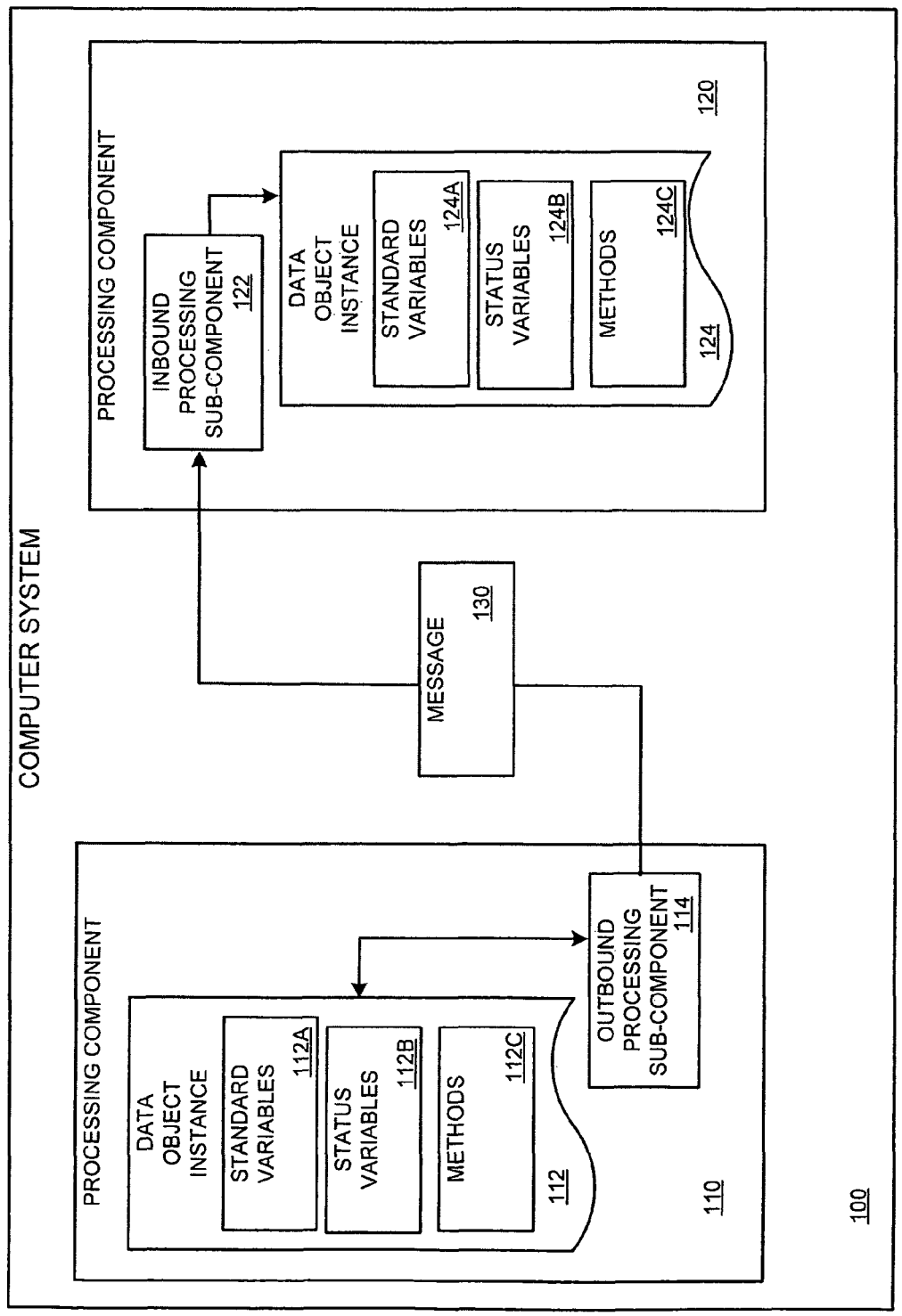
FIGS. 1A and 3-6 are block diagrams of computer systems that constrain data changes during transaction processing.

FIG. 1A depicts a computer system 100 that constrains data changes during transaction processing. The computer system 100 includes processing components 110 and 120 configured to process data object instance 112 and 124, respectively. A data object instance is a collection of data variables and methods that may be performed by the data object instance. A data object instance may correspond to a principal entity represented in the computer system 100. For example, a data object instance may correspond to a document used in a business process—such as, for example, a data object instance may correspond to a document used in the business process of delivering and invoicing merchandise sold to a customer. Another example of a data object instance includes information about a customer, an employee, a product, or a business partner (such as a supplier, distributor or reseller). A data object instance may be stored, for example, as one or more rows in a relational database table (or tables), a persistent object instance in an object-oriented database, data in one or more extensible mark-up language (XML) files, or one or more records in a data file.

In some implementations, a data object instance may be related to other data object instances. In one example, a sales order data object instance may include multiple sales order object nodes, such as a root node identifying information that applies to the sales order (such as information that identifies the customer and the date the sales order was placed) and one or more item object nodes identifying information related to each type of item ordered (such as an item number, quantity ordered, price of each item and cost of items ordered), as described more fully with reference to FIG. 1B. In another example, each of the sales order object instance, delivery object instance and invoice object instance may relate to a sale of merchandise to a customer. As such, each of those object node instances may be said to relate to one another.

In this example, each of the data object instances 112 and 124 have standard variables 112A and 124A, each of which corresponds to a characteristic or attribute of the data object instance. For example, a sales order object node instance may include, for example, standard variables identifying a customer to whom the sale was made and the date of the sale. Each of the data object instances 112 and 124 have one or more status variables 112B and 124B, respectively. A status variable indicates a status of the data object instance. For example, a status variable may indicate the status of a data object instance relative to a stage of processing. In a more particular example, a status variable may indicate whether a sales order object instance has been approved. Each of the data object instances 112 and 124 also have methods 112C and 124C that may be executed by the data object instance. The computer system 100 is configured to process other data object instances (not shown) and includes other processing component (also not shown).

Figure 1B:
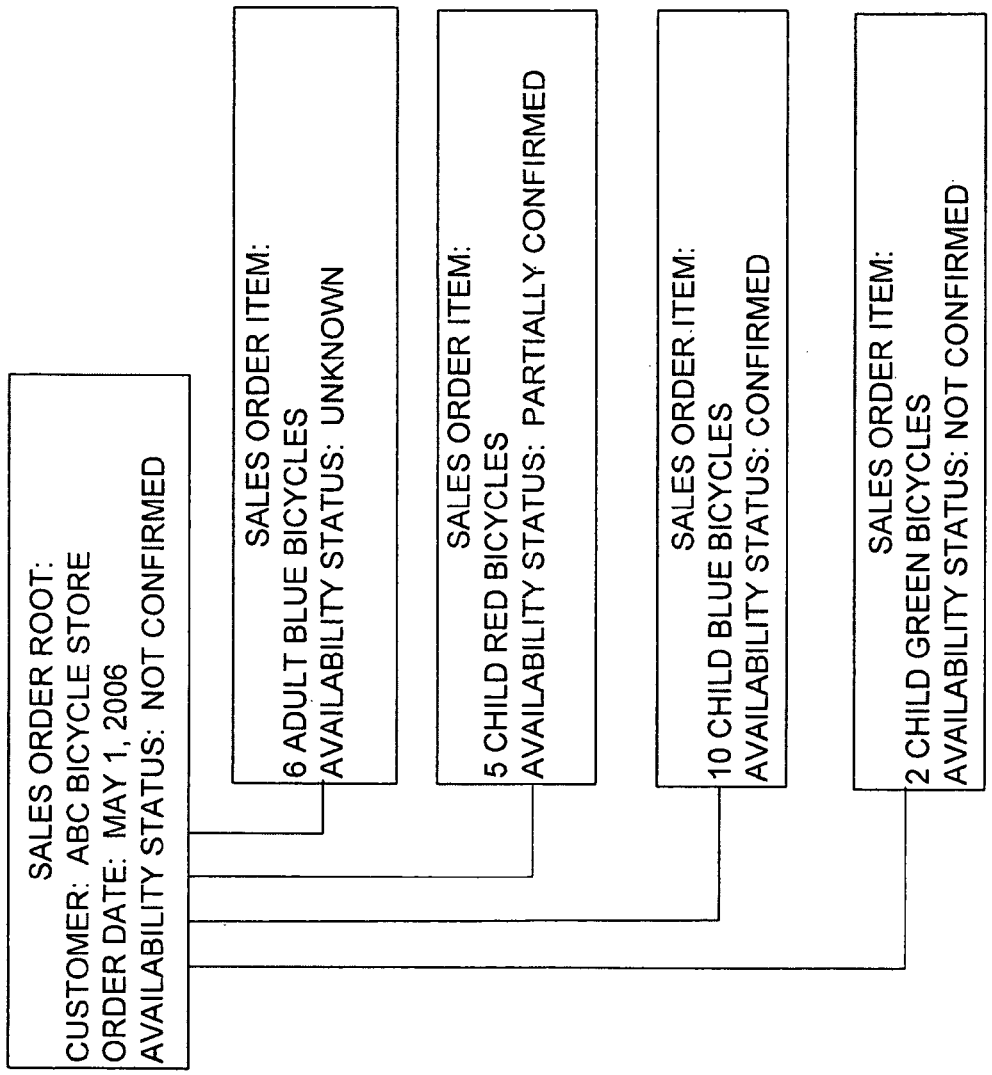
FIG. 1B is a block diagram of a sales order object instance.

FIG. 1B illustrates an example of a data object instance 150 having multiple components or nodes. As shown, the example data object instance 150 includes multiple sales order node instances 160 and 170A-170D, which collectively represent a sales order by a customer (i.e., "ABC Bicycle Store") for products (i.e., bicycles). In this example, a sales order root instance 160 is related to sales order item instances 170A-170D. The sales order root instance 160 may be referred to as the parent node of each of the sales order item instances 170A-170D. In turn, each of the sales order item instances 170A-170D may be said to be a child node of the sales order root instance 160. Each of the sales order item instances 170A-170D also may be referred to as a sibling node of the other sales order item instances 170A-170D.

More particularly, the sales order root instance 160 has a customer 161 variable with a value "ABC Bicycle Store" and an order date 162 variable with a value of "May 1, 2006." Each variable 161 and 162 may be referred to as a standard variable, attribute or characteristic of the sales order root. The sales order root 160 has an availability status variable 165 having a value of NOT CONFIRMED. The value of the availability status variable 165 is a reflection of the available status values 176A-176D of the sales order item instances 170A-170D.

Each of the sales order item instances 170A-170D has a standard variable 172A-172D with a value describing a type of bicycle and a corresponding quantity purchased. For example, sales order item instance 170A has a standard variable 172A identifying "6 adult blue bicycles" as the type and quantity of a bicycle purchased.

Each of the sales order item instances 170A-170D also has an availability status variable 175A-175D having a value 176A-176D that identifies the availability status of the bicycles identified in the standard variable 170A-170D. For example, the sales order item 170A has an availability status value 176A of UNKNOWN for six adult blue bicycles; the sales order item 170B has an availability status value 176B of PARTIALLY CONFIRMED for five child red bicycles; the sales order item 170C has an availability status value 176C of CONFIRMED for ten child blue bicycles; and the sales order item 170D has an availability status value of NOT CONFIRMED for two child green bicycles.

Referring again to FIG. 1A, the processing component 110 is configured to execute to create and/or manipulate data object instance 112. The processing component 110, for example, may execute methods 112C to generate or modify a sales order object instance or another type of data object instance in response to programmatic or user input. The processing component 110 may modify values of standard variables 112A, values related to status variables 112B and may initiate execution of one or methods 112C by data object instance 110. The processing component 110 also is configured to initiate execution of outbound processing sub-component instructions 114 that send, directly or indirectly, a message 130 to the processing component 120. The outbound processing sub-component also is enabled to change a value of one or more status variables 112B to reflect processing performed on the data object instance 112 by the processing component 110, such as reflecting the status that the message 130 as ready to be sent, being sent, or has been sent to processing component 120. This information can be used in the constraint processing for the data object instance 112. The processing component 120 may be, for example, a delivery processing component or a component operated by a customer of the entity operating processing component 110.

The processing component 120 is configured to execute instructions of inbound processing sub-component 122 in response to receiving the message 130. The inbound processing sub-component 122, for example, may update a value of a status variable of status variables 124B to indicate receipt of the message 130 by the processing component 120, or perform other functions based on receipt of the message 130. The processing component 120 is configured to execute methods 124C on, or related to, the data object instance 124. The methods 124C, for example, may generate or modify an accounting record related to a message related to the received sales order object instance or another type of data object instance in response to programmatic or user input.

In operation, for example, the processing component 110 may execute a method of methods 112C to create a sales order instance 112 corresponding to a real-world sales order and set values of standard variables 112A to reflect the real-world sales order. The processing component 110 may execute outbound processing sub-component instructions 114 to set a value of one of the status variables 112B to reflect processing performed by the processing component 110, such as indicating a message was sent (e.g., to a delivery processing component or a customer). The outbound processing sub-component 114 sends the message 130 to processing component 120, which, in turn, receives, the message 130. The processing component 120 may execute inbound processing sub-component instructions 122. The processing component 120 executes one or more of the methods 124C to create delivery record 124 related to the sales order 112 and updates a value of a status variable (of status variables 124B) accordingly.

Figure 2:
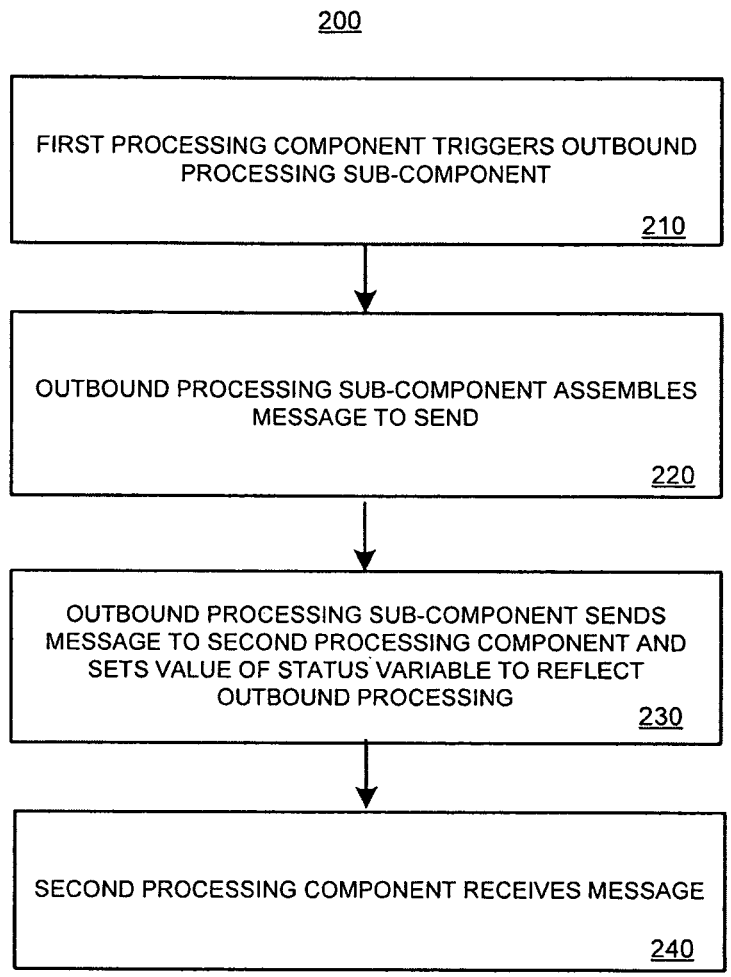
FIG. 2 is a flow chart of an example process for constraining data changes during transaction processing by a computer system.

FIG. 2 depicts an example process 200 for constraining data changes during transaction processing by a computer system. For example, the computer system executing the process 200 may be an implementation of computer system 100 described previously with respect to FIG. 1A and the process 200 may be executed on data object instance 112 of FIG. 1A or sales order object instance 150 of FIG. 1B.

A first processing component triggers (or otherwise initiates) processing by an outbound processing sub-component of the first processing component (210). For example, a processor executing a computer program, such as a method in a data object instance, may trigger execution of an outbound processing sub-component. The outbound processing sub-component assembles a message to be sent to a second processing component (220). In some implementations, the message may include variables of a data object instance processed by the first processing component. The outbound processing sub-component sends the message to the second processing component and sets the status variable to reflect outbound processing (230). The second processing component receives the message and takes appropriate action based on receipt of the message (240).

Figure 3:
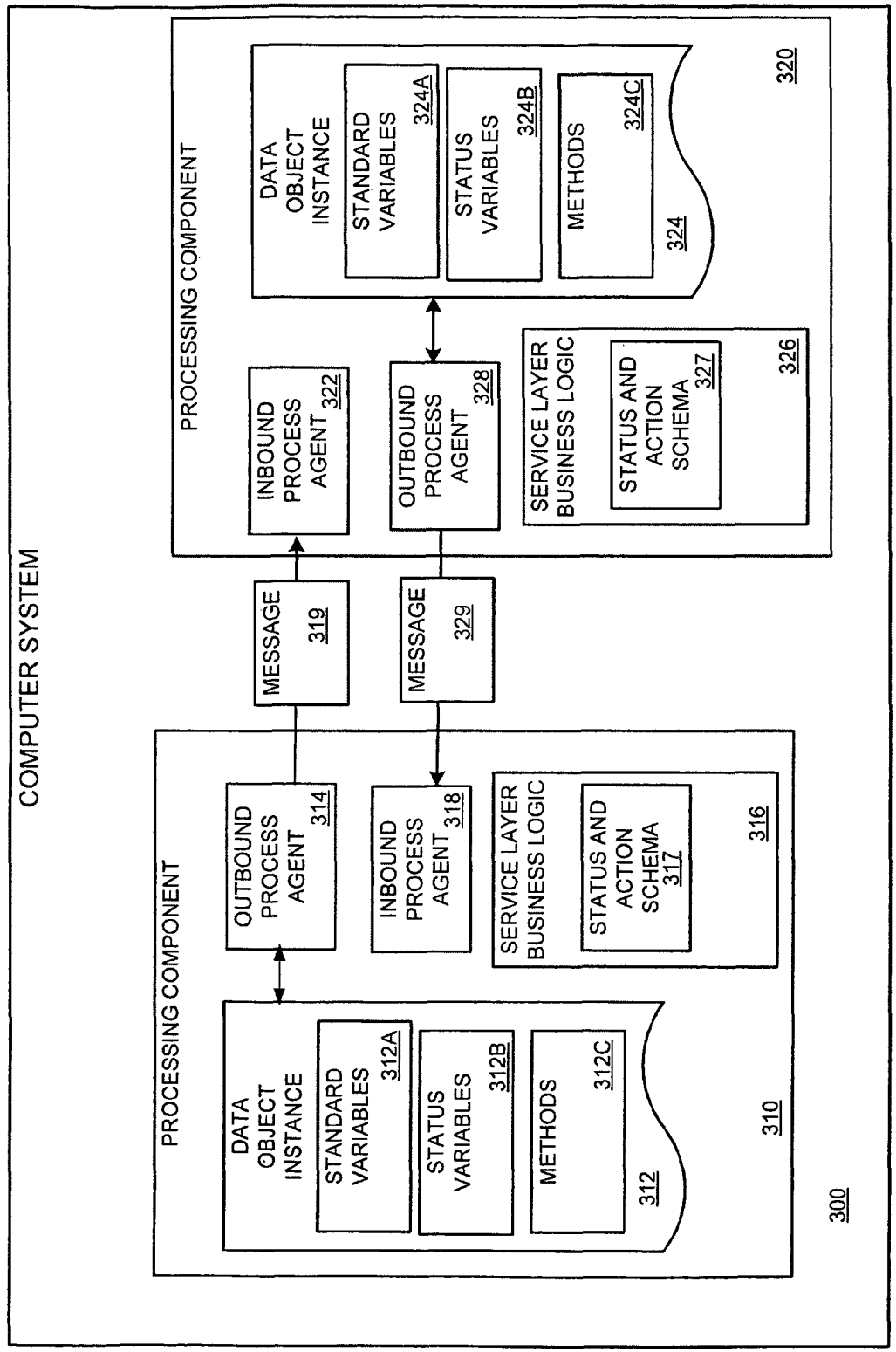

FIG. 3 depicts an example computer system 300 that constrains data changes during transaction processing. In contrast to computer system 100 described previously with respect to FIG. 1A, the computer system 300 uses a constraint-based model to control data processing. In general, the computer system 300, like the computer system 100, is configured to enable an outbound processing sub-component (here, an outbound agent 314 which is one implementation of an outbound processing sub-component) to change values for variables in a data object instance (here, the data object instance 312) to reflect processing performed by the processing component associated with the outbound process agent 314. Here, processing component 310 is associated with the agent 314. The computer system 300 is configured to prohibit the outbound processing agent 314 to change status variables 312B. This prohibition need not necessarily be constrained by the status constraint mechanism. In contrast to the computer system 100, the computer system 300 includes constraint-based models (e.g., status and action schemas 317 and 327) to control processing performed by service layer business logic 316 and 326, respectively, on the data object instances 312 and 324. Each of data object instances 312 and 324 include standard variables 312A and 324A, status variables 312B and 324B, and methods 312C and 324C, respectively.

More particularly, the processing component 310 is configured to perform processing on a data object instance 312 by applying a status and action schema 317 of the service layer business logic 316. The status and action schema 317 may include relevant status variables and associated status values, actions and conditions modeled for corresponding types of data objects. For example, at design-time, the status and action schema for a type of data object may define constraints for actions by describing which actions are allowed for which status values, and define which status values may be or are set after the completion of the action. At runtime, the service layer business logic 316 only executes actions that are permitted by the status and action schema 317 based on current values of the status variables 312B for the data object instance 312 to which business logic is being applied.

Also, in contrast with the computer system 100, the computer system 300 uses inbound and outbound process agents 314, 318, 322 and 328. Process agents are system components that trigger subsequent processing steps. For example, an outbound process agent may be called by an event handler to trigger sending a message to another processing component. In the example of computer system 300, the outbound process agent 314 of the processing component 310 sends the message 319 to the processing component 320 and, in particular, to the inbound process agent 322 of the processing component 320. The inbound process agent 322 receives the message 319 and, in response, the processing component 320 applies the service layer business logic 326 (including the status and action schema 327) to determine whether an action is permitted to be performed on the data object instance 324 based on the values of one or more status variables 324B. The processing component 320 is permitted to change standard variables 324A and status variables 324B in data object instance 324 but is not permitted to change any variables in a data object instance 312.

The outbound process agent 328 of the processing component 320 is configured to perform outbound processing when the message 329 is sent to another processing component. In this example, the message 329 is sent to the processing component 310, though the message 329 need not necessarily be sent to the processing component 310 and may be sent to another processing component.

Figure 4:
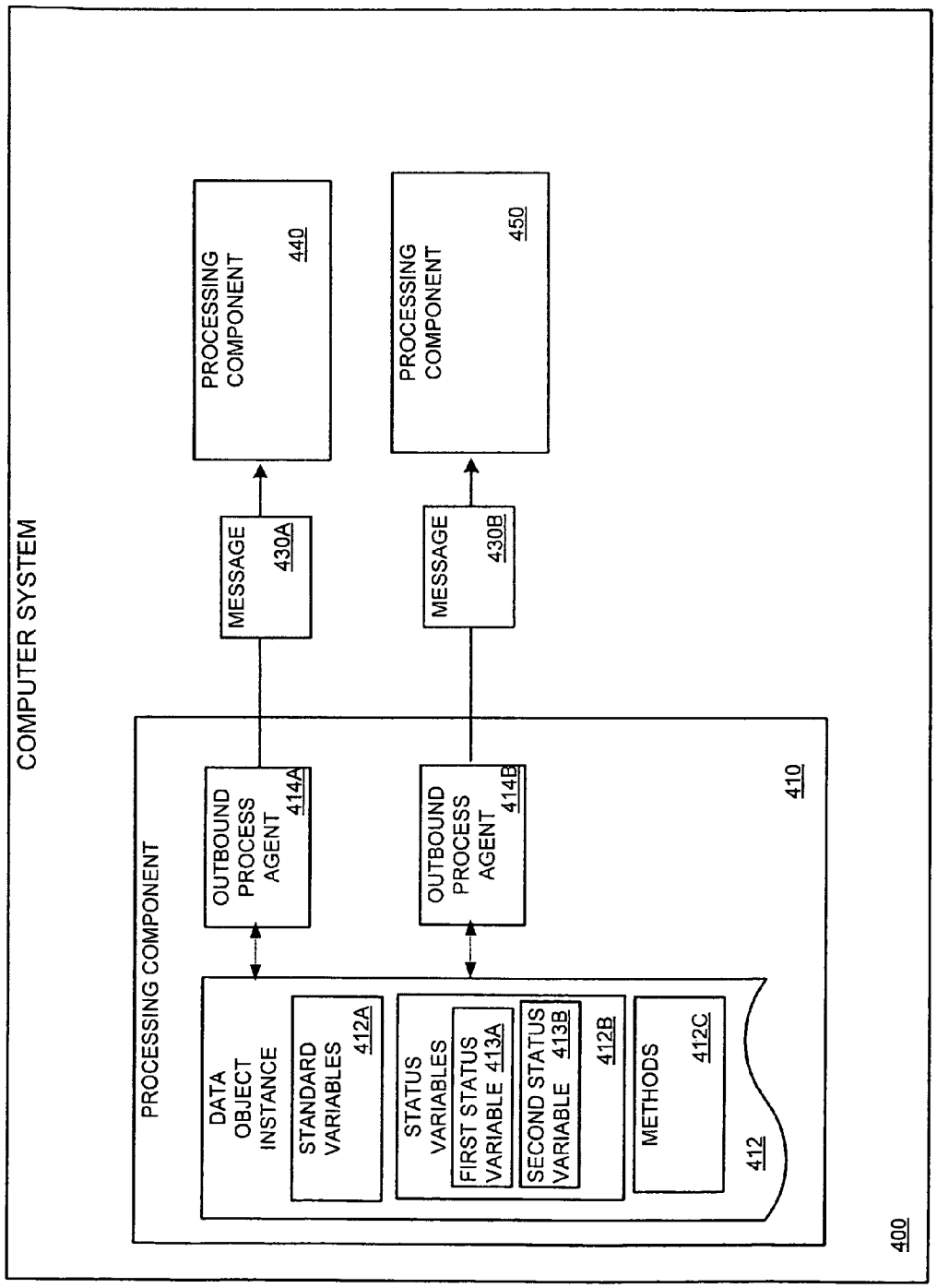

FIG. 4 depicts another example computer system 400 that constrains data changes during transaction processing. In general, the computer system 400 is configured to restrict the variables which an outbound processing sub-component can change.

More particularly, the computer system 400 includes processing components 410, 440 and 450. The process component 410 is configured to process data object instance 412. As illustrated, processing component 410 includes outbound processing agents 414A and 414B. An outbound process agent may be an example implementation of an outbound processing sub-component. Outbound processing agent 414A is permitted to change only the first status variable 413A, and is not permitted to change standard variables 412A or any status variables (such as second status variable 413B) other than the first status variable 413A. The outbound processing agent 414B is permitted to change the second status variable 413B and is not permitted to change the first status variable 413A or any of the standard variables 412A.

The outbound processing agent 414A is configured to send a message 430A to processing component 440 to trigger subsequent processing by the processing component 440. In some implementations, the message 430A may include the current value of the first status variable 413A. The message 430A may not include the second status variable 413B. The outbound processing agent 414A may use the current value of the first status variable 413A to determine processing to be triggered and is not permitted to use the current value of the second status variable 413B to determine processing to be triggered.

The outbound processing agent 414B is configured to send a message 430B to processing component 450 to trigger subsequent processing by the processing component 450. In some implementations, the message 430B may include the current value of the second status variable 413B. The message 430B may not include the first status variable 413A. The outbound processing agent 414B may use the current value of the second status variable 413B to determine processing to be triggered and is not permitted to use the current value of the first status variable 413A to determine processing to be triggered.

Figure 5:
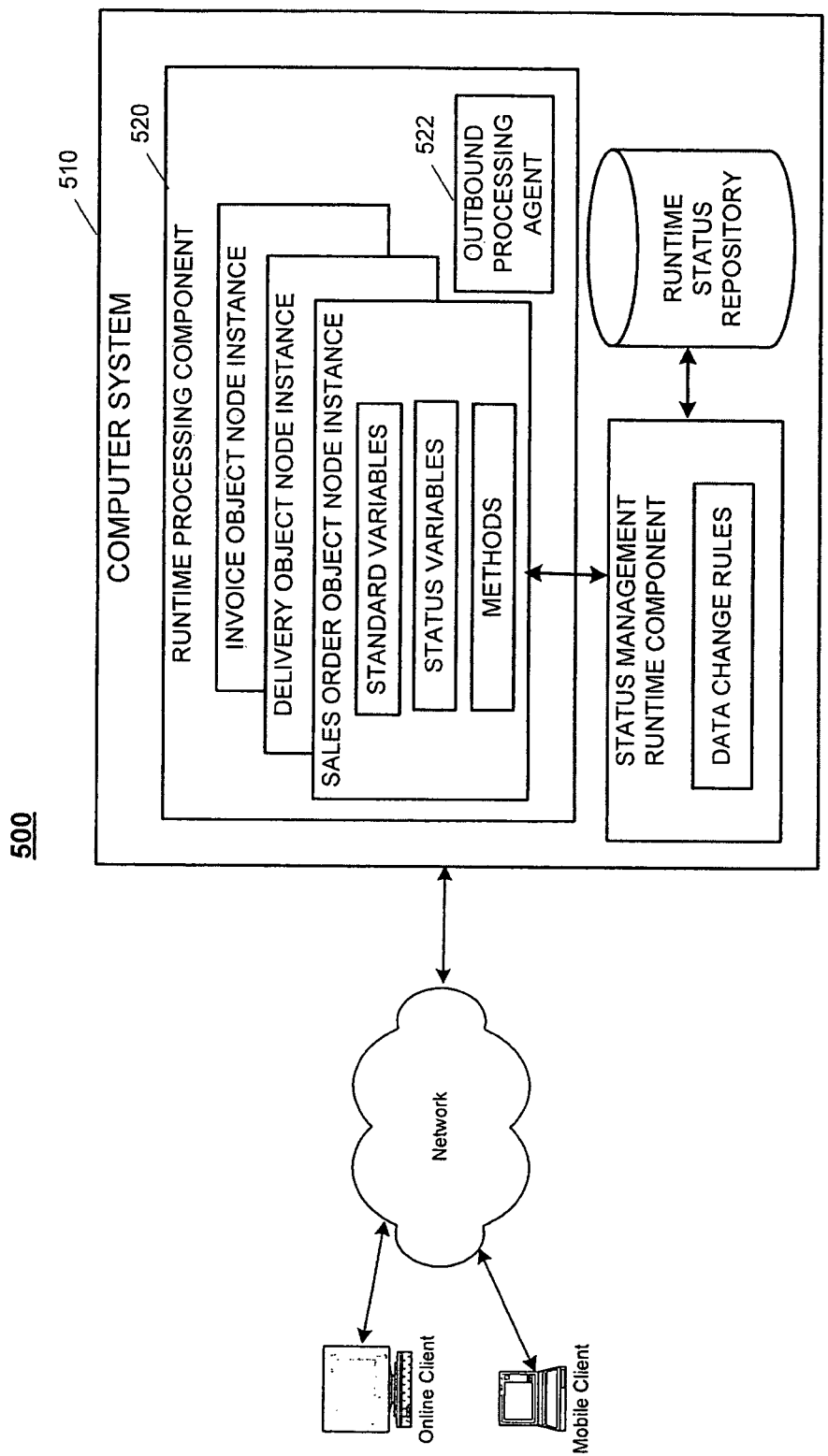

FIG. 5 is an example of a system 500 of networked computers configured to constrain data changes during transaction processing. FIG. 5 shows a computer system 510 configured to use a constraint-based model to control data processing. In general, the system 500 uses a status schema instance of a status schema model to determine whether an action is permitted to be performed by a data object instance.

More particularly, the system 500 of networked computers includes a computer system 510 having a runtime processing component 520, a runtime status management component 530 and a runtime status repository 540. The computer system 510 may be a general-purpose computer or a special-purpose computer.

The runtime processing component 520 includes various data object instances (here, sales order object instance 520A, a delivery object instance 520B and an invoice object instance 520C) and an outbound processing agent 522. Each of the object instances 520A, 520B and 520C is a collection of data variables and methods that may be performed by the data object instance. In this example, each instance 520A-520C has standard variables, each of which corresponds to a characteristic or attribute of the object instance. For example, a sales order object instance 520A may include, for example, standard variables identifying a customer to whom the sale was made and the date of the sale. Each instance 520A-520C also has one or more status variables that indicate the status of a data object instance relative to a stage of processing. In a more particular example, a status variable may indicate whether a sales order object instance 520 has been approved. Each instance 520A-520C also has methods that may be executed by the object instance. As shown, the sales order object instance 520A has standard variables 521A, status variables 522A and methods 523A. The object instances 520B and 520C also have standard variables, status variables and methods (not shown).

As shown here, the object instances 520A, 520B and 520C each correspond to a principal entity represented in the computer system 510. Each of the example object instances 520A-520C relate to a document used in a business process of delivering and invoicing merchandise sold to a customer. In another example, each of the sales order object instance 520A, delivery object instance 520B and invoice object instance 520C may relate to a sale of merchandise to a customer. As such, each of object instances 520A-520C may be said to relate to one another.

The status management runtime 530 tracks status information associated with object instances 520A-520C in the runtime status repository 540 and makes determinations, on behalf of the object instances, as to whether actions are allowed to be performed based at least in part on the status information associated with the objects in the status repository (including the status variable manipulated by the outbound processing agent).

When one of the object instances 520A, 520B or 520C of the runtime processing component 520 receives a request to perform an action, the object instance 520A, 520B or 520C sends a request to the status management runtime component 530 to determine whether the action is allowed to be performed. The status management runtime component 530 checks the runtime status repository 540 to determine whether the status information associated with the object instance 520A, 520B or 520C permits the action to be performed. The status information associated with the object instance may include the values of one or more status variables associated with the object instance and one or more constraints identifying what actions may be allowed to be performed based at least in part on the values of the one or more status variables. The status information also may include one or more constraints identifying what status variable values may be allowed to be set following the performance of an action. The status information may include one or more constraints identifying what status variable values may be changed based on a change in one or more other status variable values.

When the outcome of the determination specifies that the action is not allowed, the status management runtime component 530 sends a response to the object instance 520A, 520B or 520C indicating that the action is not allowed to be performed, and the object instance 520A, 520B or 520C processes the negative response by inhibiting the action from being performed. One example of inhibiting the action is to send an error message to the source that requested the action to be performed. Another example is to simply ignore the action request and continue on as if the action had never been requested. Yet another example is forwarding the negative response to another application for processing.

On the other hand, when the outcome of the determination specifies that the action is allowed, the status management runtime component 530 sends a response to the object instance 520A, 520B or 520C indicating that the action is allowed to be performed, and the object instance 520A, 520B or 520C processes the positive response. One example of processing a positive response is performing the action. Another example of processing the possible response is by forwarding the response to another application for processing.

In some implementations, a list of requested actions may be sent to an object instance 520A, 520B or 520C for determinations of the requested actions and subsequently returns the positive and/or negative responses to the client application for further processing.

Status variable value information associated with an object instance may be previously stored in the runtime status repository 540 or passed by the object instance along with the check action request.

The status information also may be based on a status schema instance derived from a design-time model. The status schema instance may include relevant status variables and associated status values, actions and conditions modeled for corresponding objects and stored in the runtime status repository 540. For example, at design-time, the status schema for an object type, may define constraints for actions by describing which actions are allowed for which status values, and define which status values may be or are set after the completion of the action. For example, the status schema may indicate the status variable can be changed. Data change rules 535

(which in this implementation is a separate component than the status schema) is used to specify that outbound processing agent 522 is permitted to change only a particular status variable. In some implementations, a status variable that may be changed by the outbound processing agent 522 may be modeled as an agent status variable indicating that the status variable can be changed by the outbound processing agent 522. The agent status variable may be set by calling an action, which may be referred to as an agent action.

In some implementations, the data change rules 535 may be implemented more generally in the status schema instance of a status schema model to determine whether an action is permitted to be performed by a data object instance. In such a case, for example, the status schema indicates the conditions under which the outbound processing agent 522 is permitted to change the particular status variable.

At runtime, a status schema instance may be loaded from the status repository 540 by the status management runtime 530 with the current values of the status variables for object instances.

The runtime processing component 520 illustrates a service-based approach in which services are provided by object instances 520A-520C to other computing entities over the network 525. Examples of the network 525 include the Internet, wide area networks (WANs), local area networks (LANs), or any other wired or wireless network. As illustrated in this example, services are offered to an online client system 525A and a mobile client system 525B, which each may be a general-purpose computer that is capable of operating as a client of the runtime processing component (such as a desktop personal computer, a workstation, or a laptop computer running an application program), or a more special-purpose computer (such as a device specifically programmed to operate as a client of a particular application program). For brevity, FIG. 5 illustrates only a single online client system 525A and a single mobile client system 525B. However, actual implementations may include many such computer systems.

The architecture of system 500 illustrates a service-oriented architecture, which defines objects and relationships of objects to provide services usable by other computing systems or components. The service-oriented architecture (or portions thereof) may be developed and licensed (or sold) by a commercial software developer. The service-oriented architecture 500 is one example of a computing environment in which the described principles, concepts and techniques may be implemented. The techniques apply to other architectures and system designs, as would be understood by a person skilled in the art. The service-oriented architecture is being described to illustrate an example to help articulate the described techniques.

In another example, the described techniques may be implemented in a software application or software components that are developed and licensed (or sold) by a commercial software developer. Examples of commercial software applications include customer relationship management or sales applications, supply chain management applications, financial management applications, or human resources management applications. The applications may work in conjunction with one or more other types of computer applications to form an integrated enterprise information technology (IT) solution for a business enterprise. In some architectures, for example, a service-oriented architecture, the described techniques may be implemented in data objects and as software service components.

The architecture shown in FIG. 5 may allow for a less burdensome and more coherent state management of an object instance by providing a status management runtime component 530. The runtime processing component 520 in some implementations may correspond to an application runtime component. Although the status management runtime component 530 is depicted as a separate runtime component from the runtime processing component 520, the status management runtime component 530 need not necessarily be a separate component. In one example, the status management runtime component 530 may be part of the runtime processing component 520. In another example, some or all of the functions described with respect to the status management runtime component 530 may be performed by the runtime processing component 520.

As described previously, a data object at design-time may have multiple status variables, each status variable has a predetermined, mutually exclusive set of possible status values. At runtime, each status variable of a data object instance has one of the possible status values, which may be referred to as the current value of the status variable. The current value of all status variables of a data object instance may be referred to as the "current status" of the data object instance. Alternatively, in some implementations, the current value of all status variables of a data object instance may be referred to as the "state" of the data object instance. In this description, the term "state" of the data object instance generally is used to refer to the current value of all variables (both status variables and standard variables), whereas the term "current status" of the data object instance generally is used to refer to the current value of all status variables (and not including the current value of standard variables).

Figure 6:
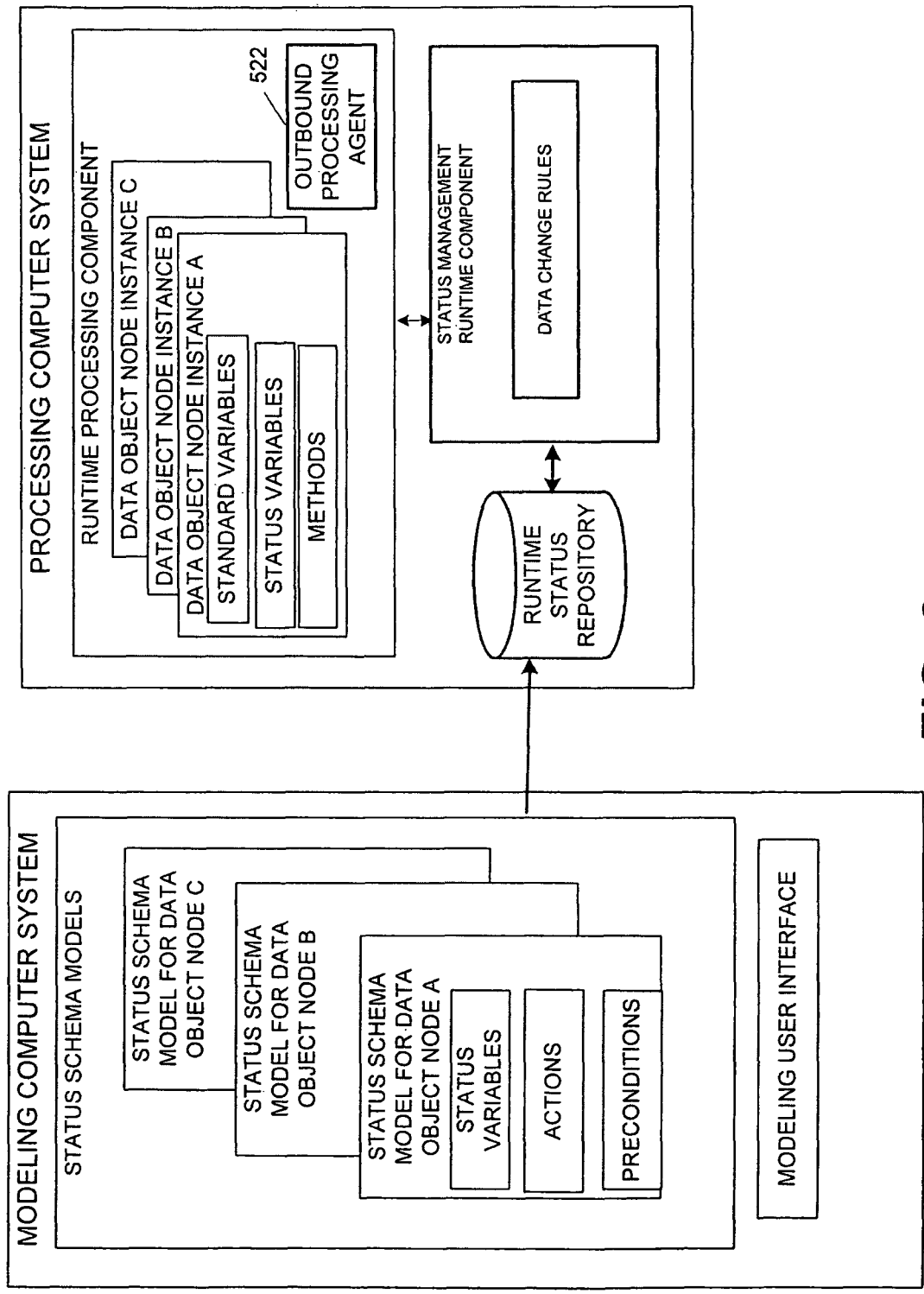

FIG. 6 shows another example of a system 600 of networked computers that uses a constraint-based model to constrain data changes during transaction processing. The system 600, like the system 500 of FIG. 5, includes a computer system 510 having a runtime processing component 520, a status management runtime component 530, data change rules 535 and a status repository 540. In this example, the computer system 510 may be referred to as a processing computer system 510.

The system 600 also includes a modeling computer system 650 capable of generating and presenting on a display device (or devices) a modeling user interface 655 for defining status schema models 660 for data objects. A data object corresponds to one or more data object instances, each of which is capable of being processed by the processing computer system 510. In general, once the status schema models 660 have been defined and, perhaps, simulated on the modeling computer system, the status schema models 660 are transformed into a format usable by the status management runtime component 530 and stored in the runtime status repository 540. As described previously, the status management runtime component 530 uses information in the runtime status repository 540 to determine whether the status information associated with a data object instance permits a particular action to be performed by the data object instance. As such, the status schema models are created in the modeling environment (here, represented by the modeling computer system) and used without modification by the runtime environment (here, represented by the processing computer system).

More particularly, the modeling user interface 655 enables a user at design-time to define a status schema model for a data object. A data object also is associated with a data model defining standard variables, status variables and methods for the data object, and, therefore, for data object instances generated for the data object.

In general, a status schema model identifies constraints for performing an action of a data object. More particularly, the status schema models 660 include a status schema model 660A for data object type A, a status schema model 660B for data object type B, and a status schema model 660C for data object type C. As illustrated by the status schema model 660A, each status schema model 660A, 660B or 660C, includes status variables 662A (and for each status variable, a set of predefined permissible values) and actions 663A. As shown, each status schema model includes preconditions (such as preconditions 664A for status schema model 660A). A precondition identifies how a status affects whether an action is to be performed at runtime by a data object instance having the status. For example, a precondition may identify a condition that must be fulfilled for an action to be performed by a data object instance corresponding to the data object to which the status schema model corresponds. An action (such as one of actions 663A) represents a process step that can be performed on an instance of a data object for which the status schema model corresponds. A precondition (such as one of preconditions 664A) is a type of constraint that generally relates an action with a status value of one of the status variables 662A. A precondition may enable or inhibit an action. At runtime, the preconditions of an action are evaluated to determine whether the action is permitted to be performed on or by the data object instance to which the status schema model relates. Each of status schema models 660B and 660C also include status variables, actions, and preconditions for actions (not shown).

In many cases, the modeling computer system 650 is used by software developers or programmers who are designing and implementing status schema models which correspond to data object types. The status schema models and data objects may be used, for example, to enable a service-oriented architecture for processing data that is applicable to many business enterprises. In such a case, data object types along with the runtime status repository that corresponds to status schema models for the data object types may be sold (or licensed) to many business enterprises. Thus, the processing computer system 510 may be operated and used by a different business enterprise than the business enterprise that operates and uses the modeling computer system 650.

In some implementations, the modeling computer system 650 may be used to extend, enhance or otherwise add to the status schema models corresponding to the data objects used in the processing computer system 510. In such a context, the modeling computer system 650 may be used by a business enterprise other than the commercial software developer who designed and implemented data objects or the runtime status repository. The modeling computer system 650, for example, may be operated by a software integrator or consulting organization that is implementing or enhancing the runtime processing component for a particular, or group of, business enterprises. In a more particular example, an initial runtime status repository may be generated from a first modeling computer system based on status schema models provided by the commercial software development organization that designed, implemented and sold the data objects used by the runtime processing component. A consulting organization may use a second modeling computer system to extend the status schema models in permitted ways for use in a particular industry or by a particular business enterprise.

Because status schema models are defined for a data object, the models enable the definitions of business processing with a fine granularity, which may help enable or improve process flexibility and reuse of the status schema models. Also, because the status schema models reflect business logic used in runtime processes, the status schema models promote visibility and transparency of business processes, which, in turn, may reduce application development errors and programming side-effects. Also, the status schema models may result in computer-supported business processes that more accurately reflect real-world business processes, which, in turn, may help to promote the development and proper use of more accurate and easier-to-understand computer systems.

Figure 7:
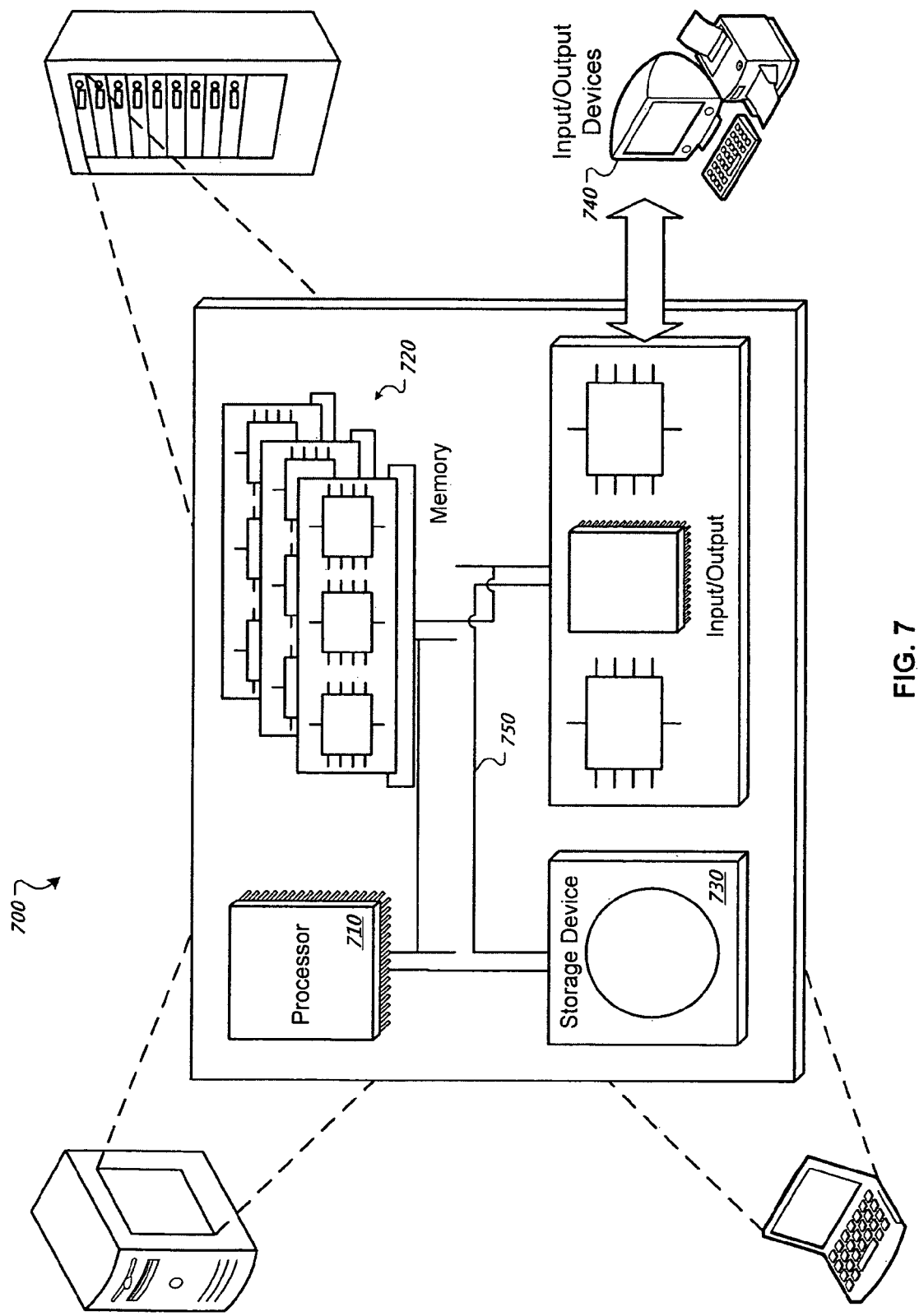
FIG. 7 is a block diagram of a computer system.

FIG. 7 is a block diagram of a computer system 700 that can be used in the operations described above, according to one implementation. The system 700 includes a processor 710, a memory 720, a storage device 730 and an input/output device 740. Each of the components 710, 720, 730 and 740 are interconnected using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In another implementation, the memory 720 is a volatile memory unit. In still another embodiment, the memory 720 is a non-volatile memory unit.

The storage device 730 is capable of providing mass storage for the system 700. In one embodiment, the storage device 730 is a computer-readable medium. In various different embodiments, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying a graphical user interface.

The techniques can be implemented in a distributed manner. For example, the functions of the input/output device 740 may be performed by one or more computing systems, and the functions of the processor 710 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the techniques, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The techniques can be implemented in digital, electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, in computer-readable storage medium, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in a non-transitory computer-readable medium, the computer program product including instructions that, when executed, cause one or more processing components to perform operations comprising:

enabling change, by a first outbound processing sub-component of a first processing component, to a first value of a first status variable relating to processing performed on a sales order data object instance by the first processing component; and enabling change, by a second outbound processing sub-component of the first processing component, to a second value of a second status variable relating to processing performed on the sales order data object instance by the first processing component, wherein:

the sales order data object instance corresponds to a sales order document used in a business process of delivering and invoicing merchandise sold to a customer and includes multiple sales order object nodes, including a root node identifying information that applies to the sales order document and one or more item object nodes identifying information related to each type of item ordered, where each item object node includes an availability status variable that identifies an availability status of a respective item and a standard variable that describes an item type and quantity ordered tier the respective item;

the first status variable indicates whether the sales order data object instance has been approved;

the second status variable reflects a value of the availability status variable for each of the one or more item object nodes;

the sales order data object instance further includes values for one or more standard variables and methods capable of being performed by the sales order data object instance;

the first outbound processing sub-component is configured to trigger subsequent processing steps in a second processing component;

the first outbound processing sub-component is permitted to change only the first status variable and is not permitted to change any other variable;

the second outbound processing sub-component is configured to trigger subsequent processing steps in a third processing component; and the second outbound processing sub-component is permitted to change only the second status variable and is not permitted to change any other variable.

2. The computer program product of claim 1 wherein:

the first outbound processing sub-component is configured to trigger the subsequent processing steps in the second processing component by sending a first message having a first type to the second processing component, and the second outbound processing sub-component is configured to trigger the subsequent processing steps in the third processing component by sending a second message having a second type to the third processing component.

3. The computer program product of claim 2 wherein the first value of the first status variable indicates the sending of the first message.

4. The computer program product of claim 2 wherein:

the first outbound processing sub-component is prohibited from including the second value of the second status variable in the message sent to the second processing component, and the second outbound processing sub-component is prohibited from including the first value of the first status variable in the message sent to the third processing component.

5. The computer program product of claim 4 wherein:

the first outbound processing sub-component is permitted to include the first value of the first status variable in the message sent to the second processing component, and the second outbound processing sub-component is permitted to include the second value of the second status variable in the message sent to the third processing component.

6. The computer program product of claim 1 wherein:

the first outbound processing sub-component is permitted to use the first value of the first status variable to determine processing to be triggered, the first outbound processing sub-component is not permitted to use the second value of the second status variable to determine processing to be triggered, the second outbound processing sub-component is permitted to use the second value of the second status variable to determine processing to be triggered, and the second outbound processing sub-component is not permitted to use the first value of the first status variable to determine processing to be triggered.

7. The computer program product of claim 1 wherein the instructions, when executed, cause the one or more processing components to:

access a status schema model defined at design-time, stored in a computer-readable medium and including a precondition identifying how a status affects whether an action is to be allowed to be performed at runtime by the sales order data object instance having the status, and create a status schema instance for the sales order data object instance, the status schema instance corresponding to the status schema model;

based on the status of the sales order data object instance, determine whether a particular action is allowed to be performed by the sales order data object instance; and in response to a determination that the particular action is allowed, enable the particular action to be executed by the first processing component.

8. The computer program product of claim 7 wherein the status of the sales order data object instance comprises a status variable and a particular status value, the particular status value being one of a set of possible status values for the status variable.

9. The computer program product of claim 7 wherein the variables of the sales order data object instance comprise one or more status variables, a status variable being associated with a set of possible status values for the status variable.

10. The computer program product of claim 7 wherein the status represents a stage in the computer-based process.

11. The computer program product of claim 7 wherein the particular action corresponds to a method of the sales order data object node instance.

12. The computer program product of claim 8 wherein the particular action corresponds to at least one status value in the set of possible status values for the status variable.

13. A computer system for constraining data changes during transaction processing, the computer system including instructions embodied on a non-transitory computer-readable medium that, when executed, enable change, by a first outbound processing sub-component of a first processing component, to a first value of a first status variable relating to processing performed on a sales order data object instance by the first processing component, and enable change, by a second outbound processing sub-component of the first processing component, to a second value of a second status variable relating to processing performed on the sales order data object instance by the first processing component, wherein:

the sales order data object instance corresponds to a sales order document used in a business process of delivering and invoicing merchandise sold to a customer and includes multiple sales order object nodes, including a root node identifying information that applies to the sales order document and one or more item object nodes identifying information related to each type of item ordered, where each item object node includes an availability status variable that identifies an availability status of a respective item and a standard variable that describes an item type and quantity ordered for the respective item;

the first status variable indicates whether the sales order data object instance has been approved;

the second status variable reflects values of the availability status variables for each of the one or more item object nodes;

the sales order data object instance further includes values for one or more standard variables and methods capable of being performed by the sales order data object instance, the first outbound processing sub-component is configured to trigger subsequent processing steps in a second processing component, the first outbound processing sub-component is permitted to change only the first status variable and is not permitted to change any other variable;

the second outbound processing sub-component is configured to trigger subsequent processing steps in a third processing component; and the second outbound processing sub-component is permitted to change only the second status variable and is not permitted to change any other variable.

14. The system of claim 13 wherein:

the first outbound processing sub-component is configured to trigger the subsequent processing steps in the second processing component by sending a first message having a first type to the second processing component, and the second outbound processing sub-component is configured to trigger the subsequent processing steps in the third processing component by sending a second message having a second type to the third processing component.

15. The system of claim 14 wherein the first value of the first status variable indicates the sending of the first message.

16. The system of claim 14 wherein:

the first outbound processing sub-component is prohibited from including the second value of the second status variable in the message sent to the second processing component, and the second outbound processing sub-component is prohibited from including the first value of the first status variable in the message sent to the third processing component.

17. The system of claim 16 wherein:

the first outbound processing sub-component is permitted to include the first value of the first status variable in the message sent to the second processing component, and the second outbound processing sub-component is permitted to include the second value of the second status variable in the message sent to the third processing component.

18. The system of claim 13 wherein the instructions, when executed:

access a status schema model defined at design-time, stored in a computer-readable medium and including a precondition identifying how a status affects whether an action is to be allowed to be performed at runtime by the sales order data object instance having the status, and create a status schema instance for the sales order data object instance, the status schema instance corresponding to the status schema model;

based on the status of the sales order data object instance, determining whether a particular action is allowed to be performed by the sales order data object instance; and in response to a determination that the particular action is allowed, enabling the particular action to be executed by the first processing component.

\* \* \* \* \*